2

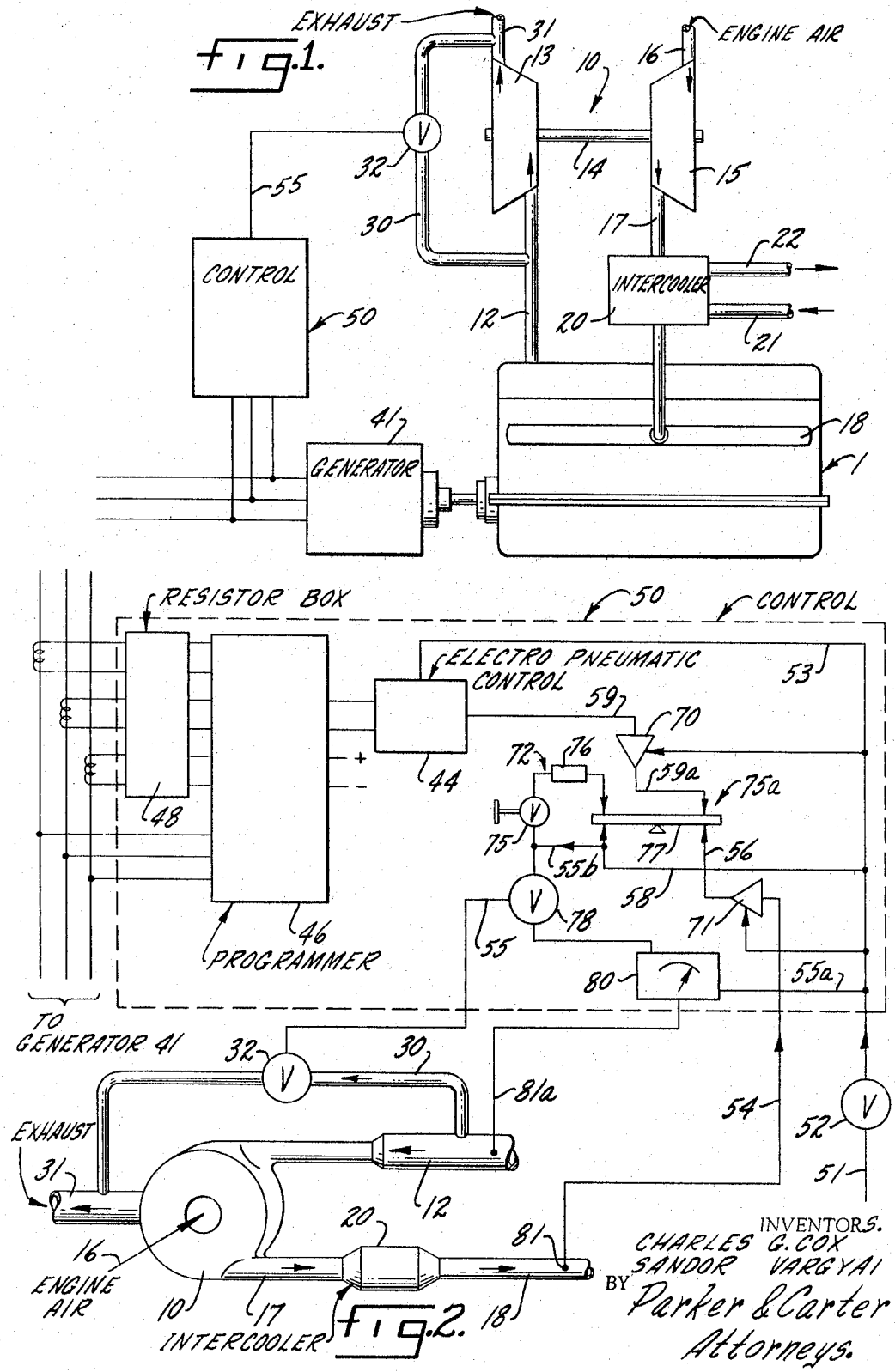

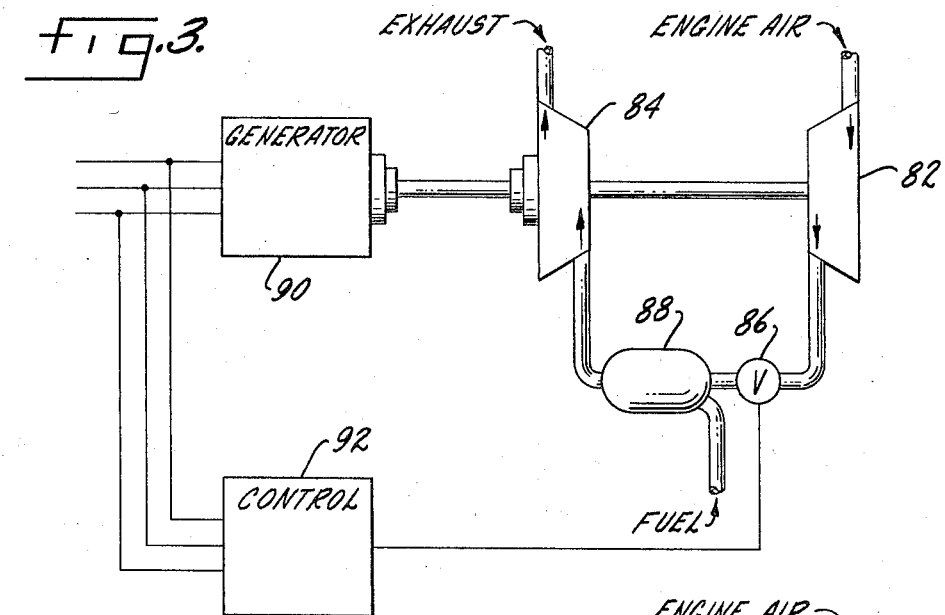
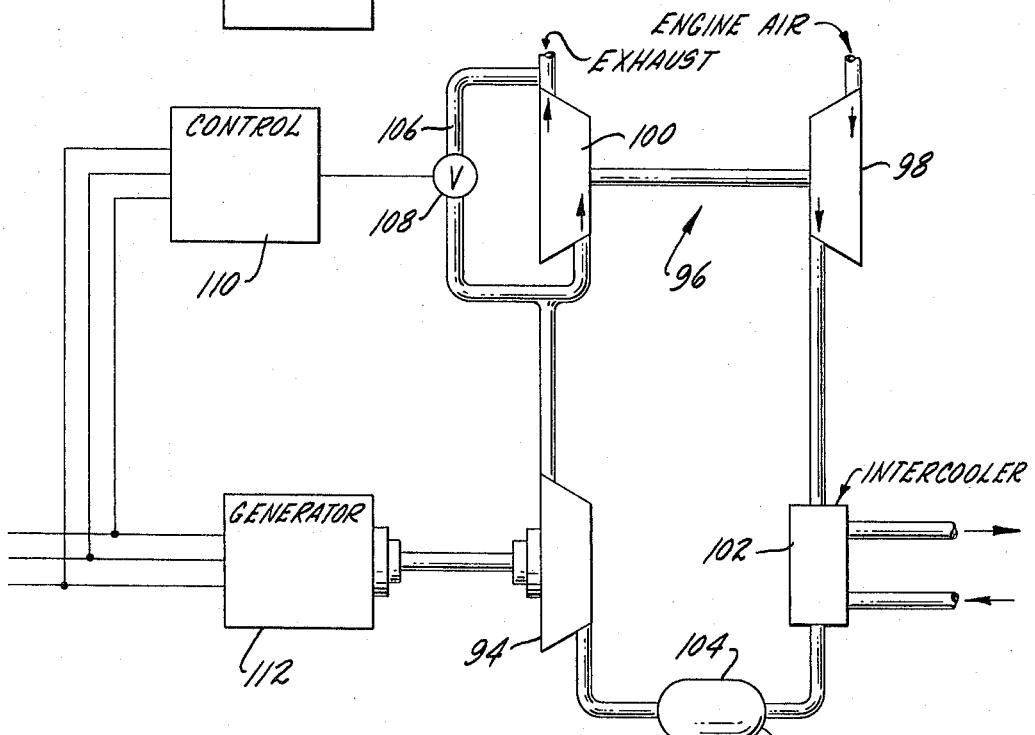

United States Patent Office 3,303,348
Patented Feb. 7, 1967

3,303,348
ENGINE AIR-FUEL RATIO CONTROL IN RESPONSE TO GENERATOR OUTPUT
Charles G. Cox, Piedmont, Calif., and Sandor Vargyai, Milwaukee, Wis., assignors to Nordberg Manufacturing Company, Milwaukee, Wis., a corporation of Wisconsin
Filed Aug. 11, 1964, Ser. No. 388,787
6 Claims. (Cl. 290—40)

This invention is in the field of internal combustion engines and is more specifically concerned with a method and apparatus for controlling and regulating the air-fuel ratio of an engine driving a generator.

The primary object of the invention is a method and apparatus for controlling the air-fuel ratio of an engine driving a generator with the control responsive to or co-ordinated with the output of the generator.

Another object is a control of the above type which is not affected by a change in the temperature of the ambient air supplied to the engine for combustion purposes.

Another object is a control of the above type which is not affected by outside variables.

Another object is an engine generator set control which is not affected by a change in B.t.u. or calorific value of the fuel supplied to the engine.

Another object is a control for an engine generator set which will maintain approximately constant air-fuel ratio when either the temperature or pressure or both of the gas supplied to the engine is charged.

Another object is a method of controlling the air-fuel ratio of an engine generator set which insures constant frequency output of the generator.

Other objects will appear from time to time in the course of the specification, claims and drawings.

The invention is illustrated more or less diagrammatically in the accompanying drawings wherein:

FIGURE 1 is a schematic view of the engine assembly;

FIGURE 2 is a diagrammatic view of the control system in FIGURE 1;

FIGURE 3 is a schematic of the invention applied to a gas turbine; and

FIGURE 4 is a schematic of a variant form of turbine.

In FIGURE 1 is shown the conventional assembly of an engine 1 and a supercharger 10, which is shown as a turbocharger but may be another type of supercharger. An exhaust pipe 12 extends from the engine 1 into the turbine 13 of the turbocharger. The exhaust gases from the engine drive the turbine 13. The turbine 13 drives a shaft 14 which drives a compressor 15. Air is drawn into the compressor by way of the inlet 16, is compressed, and is supplied through the outlet 17 to the inlet manifold at a pressure greater than atmospheric. An intercooler 20 may be placed between the inlet manifold and the compressor so that the air enters the engine at a generally constant temperature at all loads. This will prevent fluctuating temperature from being a factor in the weight of density of air delivered to the engine. The details of the intercooler have not been shown since, in and of themselves, they are not a part of the invention. The intercooler may have a suitable inlet 21 and outlet 22 for a cooling fluid, such as water. Further, the intercooler may be suitably controlled, for example, by a valve, not shown, in the water line to maintain a constant temperature air in the inlet manifold.

The air-fuel ratio of the mixture in the cylinders is controlled by comparing the weight of air actually delivered to the engine by the supercharger to the theoretical amount required to maintain a theoretically perfect air-fuel ratio relative to the fuel actually being delivered to the engine, and where a variation occurs, correction is made by altering supercharger operation to maintain the theoretically perfect amount. In the case of an exhaust driven supercharger, one way of doing this is by controlling the energy in the exhaust gases to the turbine. For example, this may be done by diverting the exhaust energy away from or around the turbine, which may be referred to as trimming the energy away from the turbocharger. The form in FIGURE 1 has a bypass 30. Any exhaust gases trimmed into the bypass 30 are vented out of the engine assembly through the exhaust 31. Situated in the bypass is a control or butterfly valve 32. When the valve 32 is closed, no exhaust gases will bypass the supercharger and, conversely, a maximum of exhaust energy will be trimmed away from the turbocharger when the valve is in a fully opened position. Thus, such trimming of exhaust gases away from the turbocharger will control the air actually delivered by the compressor to the inlet manifold 18.

The amount or weight of inlet air actually delivered to the engine should be related to the actual load on the engine. Any departure from a desired ratio for a given load alters the butterfly valve 32. The actual load on the engine is measured by kilowatt output from generator 41. A three phase lead from the generator is joined to a control indicated generally at 50. The control further senses the pressure of the actual air, and compares it with the actual load on the engine to establish the actual air-fuel ratio. The information is then fed back to the control valve 32 so that an adjustment may be made in the amount of exhaust to drive the supercharger. In this way, the actual air-fuel ratio is adjusted to the most efficient theoretical for a particular engine and particular load. Copending application S.N. 165,424, filed January 10, 1962, now Patent No. 3,173,242, issued March 16, 1965, shows the use of a governor to establish an air signal corresponding to load and a control unit to compare the load signal and the air signal to see if they depart from an ideal ratio. Reference may be made to such patent for details of the control unit and various trimming methods.

In FIGURE 2, an air signal from a compressed air supply is fed by line 51 from a conventional source. A standard pressure valve 52 is placed in line 51 to control the magnitude of air pressure which is permitted to operate in the remainder of the line. For example, the pressure may vary in magnitude in the line 51 before reaching the position of the valve 52, but thereafter the pressure will be more or less constant, say 30 p.s.i. This air signal enters line 53 and communicates with an electropneumatic transducer 44 in which an electric signal corresponding to kilowatts produced by generator 41 is converted to an air signal of appropriate magnitude. The electric signal is produced by a load box or programmer 46 and resistor box 48 which are connected by appropriate leads to the generator. The resistor and load boxes form conventional measuring circuits having usual voltage and current coils such as found in a kilowatt meter. Such a measuring circuit may be modified to handle different outputs of kilowatts and to convert them to signals which correspond to a desired range of air signals. This will, in part, depend on the physical characteristics of the engine. Specific factors which may be considered are the particular generator rating, current transformer ratio, full load, current, power factor and potential transformer ratio. In all of the possible circuits, the electric signal formed will be proportional to the energy in kilowatts produced by the generator. The electric signal will be converted into an air signal of corresponding magnitude in the transducer which air signal will be relayed along lines 59 and 59a to be compared with the actual inlet air.

The actual inlet air is delivered from the turbocharger to the inlet manifold, and a pressure tap is placed in the manifold as at 81 so that the pressure of the actual inlet air from the turbocharger can be transmitted along lines 54 and 56.

This actual inlet air may be compared with the desired value in a proportional band controller with automatic reset, generally designated as 75a. This is a known instrument and can be considered as a comparator controller in which the signal from transducer 44 is compared with the air manifold signal in line 56. The signal in line 59 may be considered as a set-point signal which is scheduled by the pneumatic transducer. The signal in line 56 may be considered as the feedback signal tapped from the air inlet manifold. For a given set-point signal, there is a selected feedback signal which indicates agreement between a desired air-fuel ratio. Any disagreement or error between set-point and feedback is corrected by the controller and then by the automatic reset shown generally at 72. The error will cause the balance 77 to alter the control output signal in line 55b. Such altered signal is also bled through needle valve 75 into volume chamber 76 and then onto balance 77. A steady state is achieved when the set-point signal equals the feedback signal and the automatic reset signal equals the control output signal. The automatic reset signal at 72 assures that no error will occur between the control output signal and air manifold signal at steady state conditions.

A group of bias relay valves, such as at 70 and 71, may be placed in the control system to move the signal into a more usable range and also to provide adjustability in the range.

The control system 50 may have a temperature controller 80 which receives temperature information from tap 81a in the exhaust manifold 12. The controller is in the nature of a safety override, that is, at high temperatures in the exhaust, the exhaust gases are fully admitted to the turbocharger to provide more air than the set-point value to the engine which will decrease exhaust gas temperature. This is done by a signal through diverting relay valve 78 and then a signal through line 55 to the control valve 32. But this is not necessary.

In FIGURE 3 we have shown a gas turbine with a compressor 82 mechanically coupled to a turbine 84. The air output from the compressor is controlled by a valve 86 on its way to a combustion chamber 88 which is supplied by fuel, as schematically shown, in any suitable manner. The hot gases from the combustor go to the gas turbine and then to the exhaust. The turbine is connected to a driving generator 90, the electrical outlet lines from the generator are connected to a suitable control 92 which, in turn, is connected to and controls the valve 86. The generator, control and valve arrangement may be the same as before.

In this form the control senses the actual load on the turbine and the output from the generator then converts this into a pneumatic, electric, hydraulic, mechanical or any other type of signal to variably position the valve 86 thereby setting the weight of air that goes to the combustion chamber. We may position an intercooler between the compressor and the combustion chamber.

In FIGURE 4 a gas turbine 94 receives high pressure air from a turbocharger 96 which includes a compressor 98 coupled to a turbine 100. The output from the compressor may go to a suitable intercooler 102 and then to a combustion chamber 104 supplied with fuel in any suitable manner. The hot gases drive the turbine 94 which exhausts to the turbocharger turbine 100. A bypass 106 may divert hot gas around the turbine 100 as controlled by a valve 108 which, in turn, is positioned by a suitable control 110 connected, as before, to the output from the generator 112 which is mechanically driven by the gas turbine 94.

The use, operation and function of the invention are as follows:

The reason for controlling the air-fuel ratio in all types of engines, but particularly gas fuel, spark-fired engines, is well known. The present arrangement and method have provided good fuel economy as well as safe combustion temperatures and pressures and stability throughout the entire load range. Basically, the system operates on a basis of varying the weight of cylinder air charge to match the ratio required for each load.

The system senses the load on the engine at the output from the generator and converts the thus sensed kilowatt output into a signal, pneumatic, electric or otherwise, which is thereby indicative of the actual load on the engine and, therefore, indicative of the desired air weight in the cylinder for that particular load. The engine has been previously fully tested so that its operating peculiarities and characteristics are known. Thus, the air weight at each and every load has been previously established so that the engine will operate most efficiently. The thus sensed signal indicates the desired air weight, and this signal is compared to the signal sensed from the inlet manifold, which is truly indicative of the actual air weight being supplied to the cylinders. Where there is a variation between the two signals, a correction is applied which trims the operation of the turbocharger to thus alter the inlet manifold pressure, i.e., the actual air weight. This correction trims the turbocharger in a manner to bring the actual air weight to the desired air weight thereby providing most efficient operation of the engine at that particular load.

The electric load is accurately computed by a solid state electronic device, which in this case gives a D.C. electric signal directly in proportion to load on the engine. This signal may be applied and programmed to give a set-point signal equal to the desired manifold pressure.

Some of the advantages of the present arrangement are that it instantly and accurately computes load and is not influenced by ambients, such as the temperature and pressure of the ambient air. The electrical output is directly proportionate to the load kw. and has instrument accuracy. The arrangement operates much faster and is much more accurate than any previously known unit and greatly improves the over-all response of the engine to load variations and fuel changes. Further, any changes in the B.t.u. or calorific value of the fuel will not affect the control.

While the arrangement has been shown as a pneumatic control, it may be electric, mechanical, or otherwise. Once the kw. signal from the generator is sensed, it may be converted by any suitable transducer into any type of signal, electric, pneumatic, hydraulic, or otherwise. The particular manner of trimming the turbocharger, shown in FIGURE 1, is efficient but not the only one that can be used. Reference is made to copending application Serial No. 165,424 now Patent No. 3,173,242, issued March 16, 1965 for various other alternatives in this regard.

While it has been stated that the invention is particularly applicable to a spark-fired, gas fuel engine, it may be used on diesel, dual fuel or otherwise.

While the preferred form and several variations of the invention have been shown and described, it should be understood that suitable other additions, alterations and variations may be made without departing from the the invention's fundamental theme.

We claim:

1. In a combustion engine driving a generator, a supercharger connected to supply inlet air to the engine, means for sensing the actual density of the air supplied to the engine, means for measuring the kilowatt output from the generator to thereby indicate the actual load on the engine, means for generating a signal from the generator output so that the resulting signal is indicative of the desired inlet air density at each and every load in accordance with the previously established most efficient operation of the engine at each and every load, means for comparing the thus sensed actual air density to the thus sensed desired air density, and means for altering the operation of the supercharger to change the actual inlet air density to the desired inlet air density if the actual air density differs from the desired air density to thereby provide an air-fuel ratio mixture at each and every load on the engine which is matched to the previous determined most efficient operation of the engine.

2. The structure of claim 1 further characterized in that the means for altering the operation of the supercharger includes a valve controlled bypass for diverting exhaust gas from the supercharger turbine, the supercharger being driven by the exhaust gases from the engine.

3. The structure of claim 1 further characterized in that the supercharger is coupled to and driven by the engine.

4. The structure of claim 1 further characterized by and including an intercooler between the supercharger and the engine to supply air to the engine at an approximately constant temperature at all loads, the means for sensing the actual density of the air being constructed to sense air pressure.

5. In a combustion engine driving a generator, a supercharger connected to supply inlet air to the engine, an intercooler between the supercharger and the engine to supply air to the engine at an approximately constant temperature at all loads, means for sensing the actual pressure of the air supplied to the engine from the intercooler means for measuring the kilowatt output from the generator to thereby indicate the actual load on the engine, means for generating a signal from the generator output so that the resulting signal is indicative of the desired inlet pressure at each and every load in accordance with the previously established most efficient operation of the engine at each and every load, means for comparing the thus sensed actual air pressure to the thus sensed desired air pressure, and means for altering the operation of the supercharger to change the actual inlet air pressure to the desired inlet air pressure if the actual air pressure differs from the desired air pressure to thereby provide an air-fuel ratio mixture at each and every load on the engine which is matched to the previously determined most efficient operation of the engine.

6. The structure of claim 5 further characterized in that the means for altering the operation of the supercharger includes a valve controlled bypass for diverting exhaust gas from the supercharger turbine, the supercharger being driven by the exhaust gases from the engine.

References Cited by the Examiner

UNITED STATES PATENTS

| | | | |
|---|---|---|---|
| 2,433,326 | 12/1947 | Sparrow | 230—5 |
| 2,474,203 | 6/1949 | Sparrow et al. | 230—5 |
| 2,482,254 | 9/1949 | Fairchild | 261—64 |
| 2,485,431 | 10/1949 | Chudyk | 170—135.74 |
| 2,530,139 | 11/1950 | Wiegand et al. | 123—25 |
| 2,861,194 | 11/1958 | Bristol | 290—2 |
| 2,833,355 | 5/1959 | Reggio | 60—13 |
| 3,040,181 | 1/1962 | Eiler | 290—40 |

ORIS L. RADER, *Primary Examiner.*

G. SIMMONS, *Assistant Examiner.*